United States Patent [19]

Burkhart et al.

[11] Patent Number: 5,293,269

[45] Date of Patent: Mar. 8, 1994

[54] ASPHERIC CYLINDRICAL LENS AND METHOD OF FABRICATION

[75] Inventors: Gordon H. Burkhart, St. Louis; Ronald A. Ferrante, St. Charles, both of Mo.

[73] Assignee: McDonnell Douglas Corporation, St. Louis, Mo.

[21] Appl. No.: 26,654

[22] Filed: Mar. 5, 1993

Related U.S. Application Data

[63] Continuation of Ser. No. 695,393, May 3, 1991, abandoned.

[51] Int. Cl.$^5$ ............................................. G02B 13/18
[52] U.S. Cl. .................................... 359/719; 359/710
[58] Field of Search ................. 359/708, 710, 718, 719

[56] References Cited

U.S. PATENT DOCUMENTS

| | | | |
|---|---|---|---|
| 4,655,556 | 4/1987 | Kajitani | 359/719 |
| 4,863,248 | 9/1989 | Saka | 359/718 X |
| 5,081,639 | 1/1992 | Snyder et al. | 359/710 X |

*Primary Examiner*—Scott J. Sugarman
*Attorney, Agent, or Firm*—Benjamin Hudson, Jr.; Timothy H. Courson

[57] ABSTRACT

An aspheric cylindrical lens for collimating, with low optical aberrations, the asymmetrically diverging beams of diode laser arrays and a method of fabricating such lenses. The aspheric cylindrical lens are formed from a plano-spherical optical lens. The planar surface of the lens is then optimized such that each ray of light from a diverging input light source will travel the same optical path length in reaching a predetermined collimation plane. Due to the optimization process, an aspherical front lens surface is formed from the initial planar lens surface. The aspheric cylindrical lens may be formed by means of a drawing process in which a master lens element is drawn into a plurality of aspheric cylindrical lens elements. In such a drawing process, a master lens element is manufactured having a spherical back lens surface and an optimized front lens surface which are proportionately identical in cross-section to resulting aspheric cylindrical lens, but substantially larger in physical dimensions. The numerous optimized aspheric cylindrical lens resulting from the drawing process may thus be produced in an economical and reliable manner.

4 Claims, 2 Drawing Sheets

ASPHERIC CYLINDRICAL LENS AND METHOD OF FABRICATION

This is a continuation of copending application Ser. No. 07/695,393 filed on May 3, 1991, now abandoned.

BACKGROUND OF THE INVENTION

The present invention relates generally to aspheric cylindrical lens for collimating, with low optical aberrations, diode laser outputs and its method of fabrication and more particularly to aspheric cylindrical lens whereby a plurality of said lenses are fabricated from a master lens element by means of drawing the master lens element into the smaller aspheric cylindrical lenses.

Diode lasers are currently utilized in many applications. Many of these applications require a collimated diode laser output with low optical aberrations, however, diode lasers typically produce asymmetrically diverging output beams. In many instances, this asymmetric divergence may be quite fast, such as an 80° output fan or larger, from the individual diode laser.

There have been a variety of proposed optical design solutions to collimate, with low optical aberrations, the asymmetric divergence of the output beam of diode lasers. One proposed solution is to mold plastic or glass aspheric optical elements in the shape desired in order to collimate the diverging output beam. An example of such a molded glass optical element is discussed in "Precision Molded-Glass Optics," written by R. Maschmeyer, et al. in Applied Optics, Volume 22, No. 6, on page 2410 in 1983. The glass optic elements which have been molded are generally limited in their ability to collimate a divergent output beam, however, due to stresses inherent in the glass element from the molding process. Additionally, molded plastic optical elements, while easier to mold than the relatively difficult to mold glass elements, tend to deform when subjected to high temperatures. Such deformation limits the plastic elements ability to collimate diode laser's output since high temperatures would often be experienced when the optical element was placed adjacent to the emitting facet of the diode laser.

An alternative method of collimating a divergent output from a diode laser involves the use of gradient index (GRIN) lenses such as the lens described in U.S. Pat. No. 4,668,053 which issued to Hissmi Nishi, et al. on May 26, 1987. While such GRIN lenses may be capable of collimating a divergent wavefront, their manufacture is typically complex. This complexity is due to the traditional methods of producing a GRIN lens by either chemical leaching of a glass rod, such that the refractive index is varied along the radius of the rod, or chemical vapor deposition of layers of particles having varied refractive indices, such that there is a concentric variation in the rod's refractive index. Thus, due to the typically complex methods for fabricating a GRIN lens, the utilization of such lenses is somewhat limited since they are quite expensive and require a sophisticated manufacturing process.

A third type of optical element for collimating a divergent output is a diffraction-based, computer-generated binary optical element as illustrated in U.S. Pat. No. 4,895,790 (hereinafter the '790 patent) which issued to Gary J. Swanson, et al. on Jan. 23, 1990. Binary optics, such as those in the '790 patent, have been able to collimate divergent wavefronts, however, the spatial resolution required of such optics has proved difficult to manufacture at a level high enough that a single binary optical element could collimate the diverging wavefront. Thus, a combination of binary and conventional refractive optical elements have typically been utilized to collimate the diverging wavefront resulting in the difficult alignment problems inherent when using a plurality of optical elements. Furthermore, the fabrication process for such binary optics is somewhat complex so that the binary optical elements produced are generally expensive.

Therefore it would be desirable to provide an optical element which is capable of collimating, with low optical aberrations, a highly divergent wavefront. Furthermore, it would be desirable if such collimating optical elements could be fabricated by a process which is relatively inexpensive and capable of mass producing such optical elements.

SUMMARY OF THE INVENTION

There is provided by this invention an aspheric cylindrical lens for collimating, with low optical aberrations, the asymmetrically diverging beams of diode laser arrays and a method of fabricating such lenses. The aspheric cylindrical lens are formed from a plano-spherical optical lens. The planar surface of the lens is then optimized such that each ray of light from a diverging input light source will travel the same optical path length in reaching a predetermined collimation plane. Due to the optimization process, an aspherical front lens surface is formed from the initial planar lens surface.

The resulting aspheric cylindrical lens may be formed by means of a drawing process. In such a drawing process, a master lens element is manufactured having a spherical back lens surface and an optimized front lens surface which are proportionately identical in cross-section to resulting aspheric cylindrical lens. The master lens element is substantially larger in physical dimensions, however, than the resulting aspheric cylindrical lens.

The master lens element is thereinafter fixably retained while it is being heated locally. The heated portion of the master lens element is subsequently drawn by means of a longitudinal tensile force into a rod. The rod may then be divided into individual aspheric cylindrical lens which retain a scaled down replication of the spherical back lens surface and the optimized front lens surface of the master lens element. In this fashion, numerous optimized aspheric cylindrical lens may be made in an economical and reliable manner.

DETAILED DESCRIPTION OF THE PREFERRED EMBODIMENT

Figure 1:
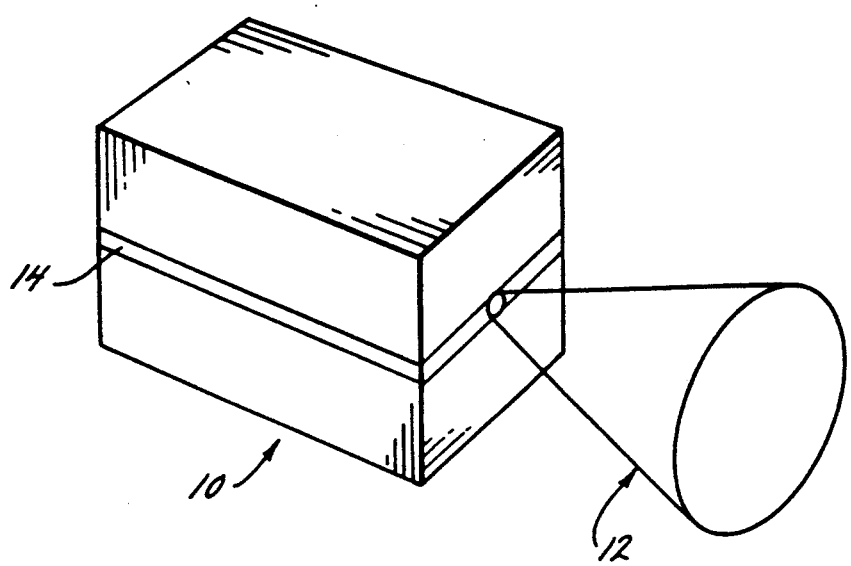
FIG. 1 is a perspective view of a diode laser illustrating its asymmetric diverging fan output.

As shown in FIG. 1, the output of a diode laser 10 typically forms an asymmetrically diverging fan 12. The asymmetrical divergence of a diode laser with an active region 14 located in a horizontal layer produces a much larger divergence along the vertical axis than along the horizontal axis. The slow horizontal divergence may thus be collimated with spherical optical elements with few resulting aberrations, however, the collimation of the fast vertical divergence requires optical elements with a much lower F/# which generally results in increased optical aberrations in the collimated output.

Figure 2:
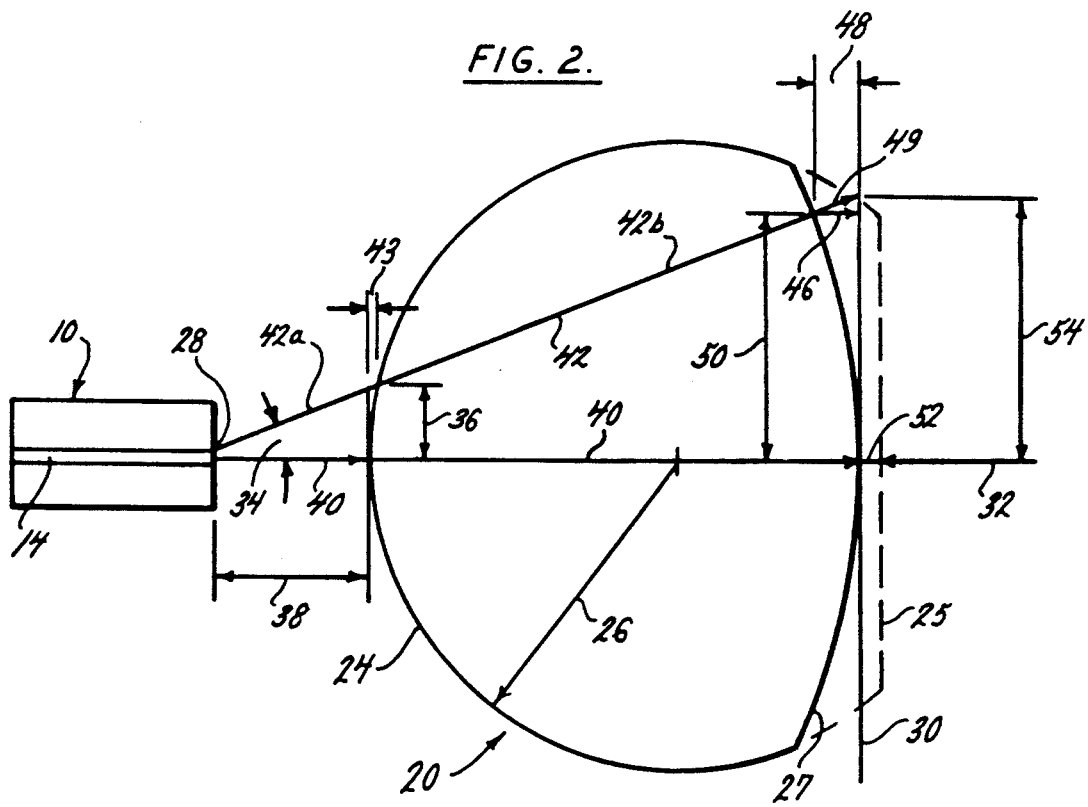
FIG. 2 is an end view of an aspherical cylindrical incorporating the principle of this invention.
Figure 3:
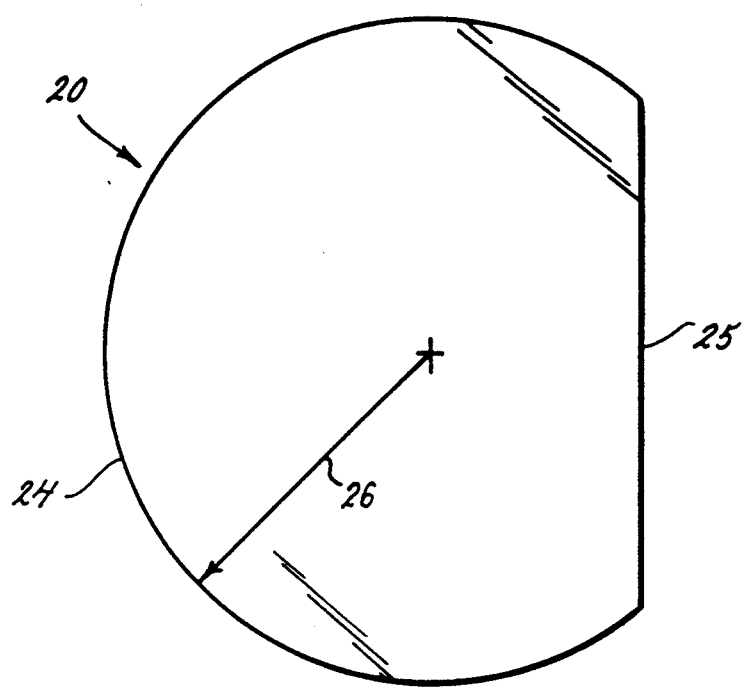
FIG. 3 is an end view of a plane aspherical lens which is utilized to form an aspheric cylindrical lens shown in FIG. 2.

The present invention, as illustrated in FIG. 2, is an aspheric cylindrical lens 20 for collimating, with few optical aberrations, the fast axis of an asymmetrically diverging output beam of a diode laser 10. The aspheric cylindrical lens 20 is produced from a lens as shown in FIG. 3, having a first spherical side and a second planar side 25 wherein the spherical side 24 has a radius R, denoted 26 in FIGS. 2 and 3, 26 and the entire lens has an index n which is selected such that the resulting optical power is sufficient to collimate the the output of a diode laser 10 with a known divergence. Once the radius R and index n of the initial lens is known, the calculations may be performed to determine the manner in which the front planar lens 25 surface must be modified in order to collimate the divergent wavefront with low optical aberrations.

As shown in FIG. 2, the contour of the optimized front lens surface 27 is determined by the results of equations involving rays of light traced from the emitting facet 28 of the diode laser 10, through the lens 20, and to a point on a collimation plane 30. The location of the collimation plane 30 determines the position at which the optical wavefront will be collimated since, due to the outcome of the equations hereinafter discussed, the phase of all of the rays of light will be equal at the point in which they intersect the plane 30. The collimation plane 30 may be located at any angle, or may be simply a point, with a resulting alteration in the equations for the optical path length from the optimized front lens surface 27 to the location of collimation utilized in insuring that each ray of the diverging input light travels an equal optical path length from its source 28 to the collimation location. A collimation plane 30, oriented perpendicular to the optical axis 32 of the output of the diode laser 10, is positioned tangentially to the point on which the optimized front lens surface 27 contacts the horizontal optical axis 32 for purposes of illustration and clarity.

In order to collimate the divergent diode laser output 12, the optical path lengths, defined as the refractive index multiplied by the physical path length, for the various rays must be identical. The rays which are traced through the lens 20 take into account the amount by which light waves of the desired wavelength are refracted when entering a lens having a predetermined refractive index. Additionally, the point on the front surface 27 of the lens 20 which determines the distances of the optical path length from the back lens surface 24 to the front lens surface 27 and the optical path length from the front lens surface 27 to the collimation location is typically not a point on the original planar front surface 25 of the lens, but is instead a point located slightly on the interior of the original planar front lens surface 25. This point, the exact position of which will be calculated mathematically as hereinafter described, represents a point on the optimized aspherical front lens surface 27, the shape of which the ray tracing process is used to determine.

While rays may be traced for divergent output light both above and below the optical axis 32, the diverging fan beam 12 of a diode laser 10 is typically vertically symmetric about the horizontal plane in which the active region of the diode laser is located so that rays need only be traced for the divergent output on one side of the optical axis 32. The aspheric front surface 27 of the lens 20 determined through the ray tracing on the one side of the optical axis 32 may thereinafter be replicated for the other side of the front lens surface 27. The aspheric front lens surface 27 will therefore be symmetric in profile about the optical axis 32.

While any number of rays which differ in their divergence angle from the emitting facet 28 of the diode laser 10 may be traced with an enhanced optimization of the front surface of the lens 27 resulting from the tracing of an increased number of distinct rays, a finite number of rays is selected to simplify the computations. Typically, the use of one ray for each angle of divergence 34 above the horizontal plane 32 is sufficient, such as tracing 40 rays spaced apart by 1° in their initial divergence angles for a diode laser 10 with a 40° half-angle divergence. Alternatively, the spacing of the rays to be traced may be controlled by varying the height 36, above the horizontal plane 32, at which the rays enter the back lens surface 24 such that representative rays are traced over the entire back lens surface 24 which the laser output will illuminate.

Exemplary calculations may be performed for the pair of rays shown in FIG. 2 which are traced through a plano-spherical lens 22 having a back surface of radius R and a refractive index n. The lens 20 is located a distance BFD 38 from the emitting facet 28 of the diode laser 10 and the rays are diverging at an angle $\Theta_1$, denoted 34 in FIG. 2, from the optical axis 32 and entering the back lens surface 24 at a known height $H_1$, denoted 36 in FIG. 2, from the optical axis 32.

For the on-axis ray 40, the optical path length is calculated as:

$$OPL_0 = BFD + nR + n(R - OS)$$

Similarly, the total optical path length for the off-axis ray 42 is calculated by first calculating $OPL_1$, denoted 42a in FIG. 2, and $OPL_2$, denoted 42b in FIG. 2, which are summed to determine the total optical path length. The optical path length components for the off-axis ray 42 are calculated as:

$$OPL_1 = (H_1^2 + (BFD + SAG_1(H_1))^2)^{\frac{1}{2}}$$

$$OPL_2 = n(((2R - SAG_1(H_1) - OS) \cdot \tan \Theta_2)^2 + (2R - SAG_1(H_1) - OS)^2)^{\frac{1}{2}})$$

wherein $SAF_1(H_1) = R - (R^2 - H_1^2)^{\frac{1}{2}}$. As the notation dictates, $SAG_1(H_1)$, denoted 43 in FIG. 2, is a function of $H_1$ and measures the horizontal difference between a vertical plane positioned tangentially to the lens 20 at the optical axis 32. OS, denoted 52 in FIG. 2, is the horizontal difference between the original plane front lens surface as shown is FIG. 3 and the optimized front lens surface 27 as shown in FIG. 2. Angle $\Theta_2$, denoted 44 in FIG. 2, is the angle which an off-axis ray 42 makes with a horizontal plane within the lens 20. Angles $\Theta_1$ and $\Theta_2$ may be calculated as:

$$\Theta_1 = \tan^{-1}(H_1/SAG_1(H_1))$$

$$\Theta_2 = \sin^{-1}((\sin(\sin^{-1}(H_1/R) + \Theta_1))/n) - \sin^{-1}(H_1/R).$$

The optical path difference Δ is the difference between the path length for an on-axis 40 and an off-axis ray 42 as expressed by:

$$\Delta = OPL_1 + OPL_2 - OPL_0$$

Alternatively, the optical path difference Δ is equal to the difference in the distance traveled by the off-axis ray 42 in the original plano-spherical lens 22 and the distance traveled once the front lens surface has been aspherically optimized. With the original plano-spherical lens 22, the off-axis 42 ray travels linearly from the back lens surface 24 to the vertical plane 30. Once the front lens surface 27 has been optimized, the off-axis ray 42 will travel from the back lens surface 24 to the now optimized front lens surface 27. The ray 42 is then refracted at the optimized front lens surface 32 and will travel along a line 46 parallel to the optical axis 32 until it reaches the collimation plane 30. Thus, the optical path difference Δ may be expressed as:

$$\Delta = nD - (D^* \cos \Theta_2) = D(n - \cos \Theta_2)$$

wherein ($D^* \cos \Theta_2$) is further defined as $SAG_2(H_2)$, denoted 48 in FIG. 2, which is a function of $H_2$, denoted 50 in FIG. 3, as the notation dictates. $H_2$, as shown in FIG. 2, is the height above the optical axis 32 which an off-axis ray 42 strikes the optimized front lens surface 27. Likewise, $SAG_2(H_2)$ is a measure of the horizontal difference between the collimation plane 30 one the optimized front lens surface 27. The dependence of $SAG_2(H_2)$ on $H_2$ is due to the corresponding dependence of D, denoted 49 in FIG. 2, on the value of $H_2$ as hereinafter discussed. D is the measure of the distance between the optimized front lens surface 27 and the collimation plane 30 along a line collinear to the ray 42b traced from the back lens surface 24 to the optimized front lens surface 27. The value of D may be determined by setting the two aforementioned equations for Δ equal with the value of OS taken to be zero for the initial iteration and solving for D as:

$$D = (OPL_1 + OPL_2 - OPL_0)/(n - \cos \Theta_2).$$

As shown in FIG. 3, $H_3$, denoted 54 in FIG. 2, is the height above the horizontal plane 32 which an off-axis ray 42 intersects the collimation plane 30 positioned tangentially to the now optimized lens 20 at the horizontal plane 32. Likewise, ΔH is the difference in height between $H_3$ and $H_2$. ΔH may be calculated as:

$$\Delta H = ((D)^2 - SAG_2(H_2)^2)^{\frac{1}{2}}.$$

Additionally, $H_3$ may be calculated as:

$$H_3 = H_1 + (2R - SAG_1(H_1))(\tan \Theta_2).$$

From these values of ΔH and $H_3$, $H_2$ may be calculated as:

$$H_2 = H_3 - \Delta H.$$

Thus, from the prior equations the initial optimization of the front lens surface 27 may be determined. The optimized front lens surface 27 is located at the coordinates of ($H_2$, $SAG_2(H_2)$) wherein $H_2$ is the measure of vertical displacement and $SAG_2(H_2)$ is the measure of horizontal displacement in a direction extending from the collimation plane 30 toward the interior of the lens 20. By varying the value of $H_1$ over the range of potential divergence angles, a set of ($H_2$, $SAG_2(H_2)$) coordinates are obtained which may be used to optimized the front lens surface 27.

Once the initial values of $H_2$ and $SAG_2(H_2)$ have been determined, the aforementioned equations may be calculated once again with the value of OS set equal to the maximum value of $SAG_2(H_2)$ that was calculated over the range of $H_2$ values. This reiteration process is continued until the variance in OS between successive iterations is sufficiently small for the lens' application and fabrication process. The accuracy of the lens 20 increases with the decreasing variance in OS between successive iterations, however, the lens' fabrication process may limit the maximum accuracy. Preferably, the iterations are continued until the variance in OS between successive iterations is approximately 1 micron.

Once the variance in OS between successive iterations is small enough to end the iterative calculating process, the ideal front lens surface 27 may be determined as that set of points corresponding to the coordinates ($H_2$, $SAG_2(H_2)$) from the final iteration. It should be noted that the $SAG_2(H_2)$ value derived from the final iteration is the measure from the collimation plane 30 of the final iteration which is positioned a horizontal distance of OS within the original planor front surface 25 of the lens 20. Thus, the coordinator of the ideal front lens surface 27, as measured from the original planor front lens surface 25 is ($H_2$, $SAG_2(H_2)$+OS). A master lens element 60, as shown in FIG. 4, is then fabricated which has a front lens surface having the shape determined by the coordinates ($H_2$, $SAG_2(H_2)$+OS).

The master lens element 60 is a scaled replica of the desired aspherical lenses 20. Typically, all aspects the master lens element 60 will be five or ten times the size of the corresponding portion of the desired aspherical lens, however, in all other respects, including the optimized front lens surface, the master lens element is an identical scaled replica of the desired aspherical lenses 20. Thus, the master lens element 60 will have a radius that is a predetermined multiple of the radius value R previously utilized in calculating the optimized front lens surface 27. The master lens element 60 may be fabricated in any conventional fashion, such as by grinding and polishing or by means of diamond turning.

Figure 4:
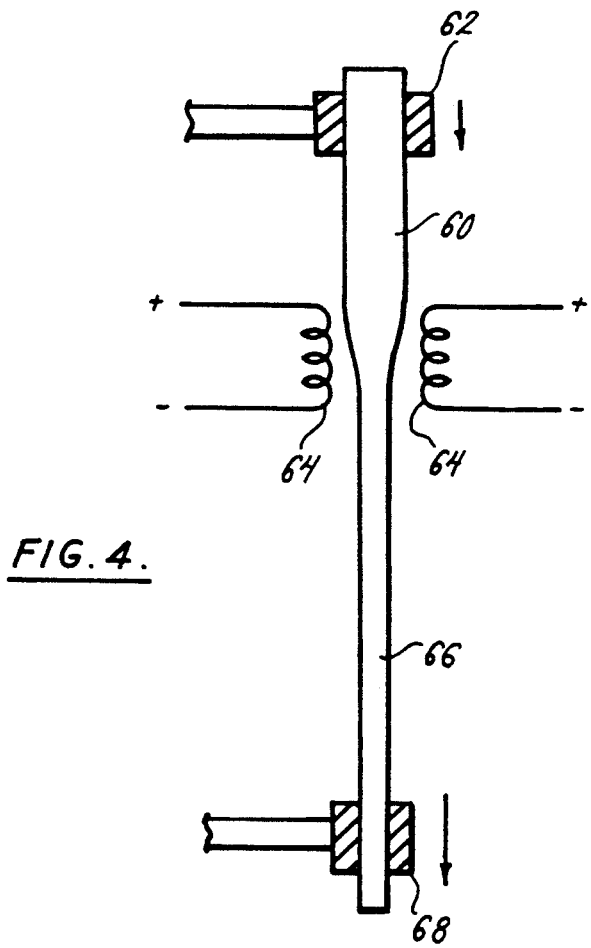
FIG. 4 is a side view of a drawing tower utilized to replicate a master lens element into an aspherical rod.

Following the fabrication of the master lens element 60, the master lens element 60 is placed in a drawing tower or any other suitable replication means as shown in FIG. 4. The master lens element 60 is thereafter heated and drawn so as to replicate the design of the master lens element 60 in the smaller aspherical lenses 20. Each resulting aspherical lens 20 will have the radius 26 previously determined to be optimum as well as retaining the shape, such as the optimized front lens surface 27, of the master lens element 60. Drawing towers and the drawing process are well known to those skilled in the art as shown in U.S. Pat. Nos. 4,101,300 issued to Katsuyuki, et al. on Jul. 18, 1978 and 4,198,223 issued to Goell, et al. on Apr. 15, 1980 illustrating drawing towers utilized to draw optical fibers. Additionally, a drawing method has been utilized with respect to the manufacture of intraocular lenses in U.S. Pat. No. 4,071,343 issued to Walter P. Siegmund on Jan. 31, 1978. Therefore, by determining the radius and type of glass of the master lens element 60 and the desired radius 26 of the smaller aspherical lenses 20, one skilled in the art could suitably draw the master lens element 60.

A typical drawing process consists of placing the master lens element 60 in a holding means 62 comprising a portion of a drawing tower as shown in FIG. 4. The master lens element is thereafter passed through a heating means at a predetermined speed while also being subjected to relatively high tension such that the master lens element 60 may be drawn to a reduced diameter while retaining an identical, although smaller, cross-sectional area. The tension may be introduced by means of a gripping means 68 which firmly holds the resulting rod 66. Such gripping means 68 advances longitudinally at a speed in excess of the rate at which the master lens element 60 is passed through the heating means 64 so as to draw additional optical material from the master lens element 60 to the rod 66. The speed, temperature, and tension to be applied are well known to those skilled in the art as previously discussed. The resulting aspherical rod 66, following the draw, may be subsequently divided, perpendicular to the longitudinal axis of the resulting rod 66, into numerous aspherical lenses 20, each having the desired front lens surface 27. Thus, the drawing process provides an economical method of producing many aspherical lens 20 each of which have an optimized front lens surface 27.

Although there has been illustrated and described specific detail and structure of operations, it is clearly understood that the same were merely for purposes of illustration and that changes and modifications may be readily made therein by those skilled in the art without departing from the spirit and the scope of this invention.

We claim:

1. An optical lens for collimating a divergent input light, comprising:
   - a substantially cylindrical and spherical back lens surface;
   - a cylindrical and aspherical front lens surface defined by a plurality of coordinates, a set of said coordinates consisting of a first displacement from an optical axis of a divergent input light and a second displacement from a collimation plane, said optical axis and said collimation plane being orthogonally positioned wherein said front lens surface has been formed such that the optical path length traveled by each ray of said divergent input light from a source of said divergent input light to the collimation plane is substantially equal; and,
   - said plurality of sets of coordinates satisfy the following conditions (1) and (2):

$$H_2 = H_1 + (2R - (R - (R^2 - H_1^2)^{\frac{1}{2}}))(\tan \Theta_2) - ((D)^2 - SAG_2(H_2)^2)^{\frac{1}{2}}$$

$$SAG_2(H_2) = D * \cos \Theta_2$$

wherein reference symbol R is a radius of curvature of said spherical back lens surface, reference symbol $H_1$ is a height above said optical axis which an off-axis diverging input light ray enters said back lens surface, reference symbol $\Theta_2$ is an angle between an off-axis ray and a line parallel to said optical axis, and reference symbol D satisfies the following condition (3):

$$D = (OPL_1 + OPL_2 - OPL_0)/(n - \cos \Theta_2)$$

wherein reference symbol n is a refractive index of a lens medium for said optical lens, reference symbol $OPL_0$ is an optical length, measured along said optical axis, from the source of said diverging input light to said aspheric front lens surface, reference symbol $OPL_1$ is an optical length, measured along an off-axis ray of input light from said source of said diverging input light to a point on said back lens surface, and reference symbol $OPL_2$ satisfies the following condition:

$$OPL_2 = n(((2R - (R - (R^2 - H_1^2)^{\frac{1}{2}} - OS) * \tan \Theta_2)^2 + (2R - (R - (R^2 - H_1^2)^{\frac{1}{2}} - OS)^2)^{\frac{1}{2}}) \quad (4)$$

wherein reference symbol OS is the distance, measured along said optical axis, from said collimation plane to said aspherical front lens surface.

2. The optical lens as recited in claim 1 wherein said reference symbol $\Theta_2$ satisfies the following condition:

$$\Theta_2 = \sin^{-1}((\sin(\sin^{-1}(H_1/R) \tan^{-1}(H_1/(R - (R^2 - H_1^2)^{\frac{1}{2}}))))/n) - \sin^{-1}(H_1/R).$$

3. The optical lens as recited in claim 2 wherein said reference symbol $OPL_0$ satisfies the following condition:

$$OPL_0 = BFD + nR + n(R - OS)$$

wherein reference symbol BFD is a distance, measured along said optical axis, from said source of said diverging input light to said back lens surface.

4. The optical lens as recited in claim 3 wherein said reference symbol $OPL_1$ satisfies the following condition:

$$OPL_1 = (H_1^2 + (BFD + (R - (R^2 - H_1^2)^{\frac{1}{2}}))^2)^{\frac{1}{2}}.$$

* * * * *